(12) United States Patent  (10) Patent No.: US 7,721,382 B2
Malone                     (45) Date of Patent:     May 25, 2010

(54) FRAMELESS, HEATED WIPER ASSEMBLY AND SYSTEM UTILIZING SAME

(76) Inventor: Randolph W. Malone, 3103 E. Dryden, Metamora, MI (US) 48455

( * ) Notice: Subject to any disclaimer, the term of this patent is extended or adjusted under 35 U.S.C. 154(b) by 511 days.

(21) Appl. No.: 11/738,734

(22) Filed: Apr. 23, 2007

(65) Prior Publication Data

US 2008/0256738 A1  Oct. 23, 2008

(51) Int. Cl.
    *B60S 1/38* (2006.01)
(52) U.S. Cl. .............................. 15/250.07; 15/250.201; 15/250.43; 219/202
(58) Field of Classification Search . 15/250.05–250.08, 15/250.201, 250.43, 250.3; 219/202, 203
    See application file for complete search history.

(56) References Cited

U.S. PATENT DOCUMENTS

| | | | |
|---|---|---|---|
| 2,627,011 A | 1/1953 | Eaves | |
| 4,138,759 A | 2/1979 | Voorhees | |
| 4,152,808 A | 5/1979 | Andregg | |
| 4,194,261 A | 3/1980 | Parkinson | |
| 4,325,160 A | 4/1982 | Burgess | |
| 4,387,290 A | 6/1983 | Yasuda | |
| 4,497,083 A | 2/1985 | Nielsen, Jr. et al. | |
| 4,928,344 A | 5/1990 | Bliss | |
| 4,928,345 A | 5/1990 | Meltzer et al. | |
| 4,967,437 A | 11/1990 | Morse | |
| 5,157,314 A * | 10/1992 | Kuhbauch | 318/443 |
| 5,325,561 A | 7/1994 | Kotlar | |
| 5,412,177 A | 5/1995 | Clark | |
| 5,488,752 A | 2/1996 | Randolph | |
| 5,504,965 A | 4/1996 | Guell | |
| 5,558,792 A | 9/1996 | Gauharon | |
| 5,603,856 A | 2/1997 | Bischoff | |
| 5,632,058 A | 5/1997 | Stanak | |
| 5,831,242 A | 11/1998 | Gallagher | |
| 6,236,019 B1 | 5/2001 | Piccione et al. | |
| 6,507,973 B1 | 1/2003 | Friesen | |
| 6,591,443 B1 | 7/2003 | Gilpin | |
| 6,754,933 B1 | 6/2004 | Pettersson | |
| 6,779,222 B2 | 8/2004 | Tobias | |
| 6,874,195 B2 | 4/2005 | Kotlarski et al. | |
| 2006/0026786 A1 * | 2/2006 | Ku | 15/250.32 |
| 2007/0089258 A1 | 4/2007 | Wick | |

OTHER PUBLICATIONS

International Search Report and Written Opinion dated Dec. 9, 2008 for the corresponding PCT Serial No. PCT/US08/79684, filed Oct. 13, 2008.

* cited by examiner

*Primary Examiner*—Gary K Graham
(74) *Attorney, Agent, or Firm*—Brooks Kushman P.C.

(57) ABSTRACT

A heated wiper system including at least one frameless, heated wiper assembly is provided. Each wiper assembly includes a flexible squeegee blade and a pair of spaced flexible backing members. The assembly includes a pair of flexible heaters disposed between the blade and their respective backing member to convert electrical energy from a source of electrical energy (i.e., a battery) into heat. Each heater includes a heating element sufficiently dimensioned to sinuously travel back and forth between the sides of the assembly substantially the entire length of its respective backing member. Wiring connects the battery to the heaters by extending through a sealed center support apparatus which connects the blade, the heaters and elongated resilient spines together between the backing members.

25 Claims, 4 Drawing Sheets

FRAMELESS, HEATED WIPER ASSEMBLY AND SYSTEM UTILIZING SAME

BACKGROUND OF THE INVENTION

1. Field of the Invention

This invention relates to frameless, heated wiper assemblies and systems utilizing such assemblies.

2. Background Art

Figures 4, 5A, 5B, 5C:
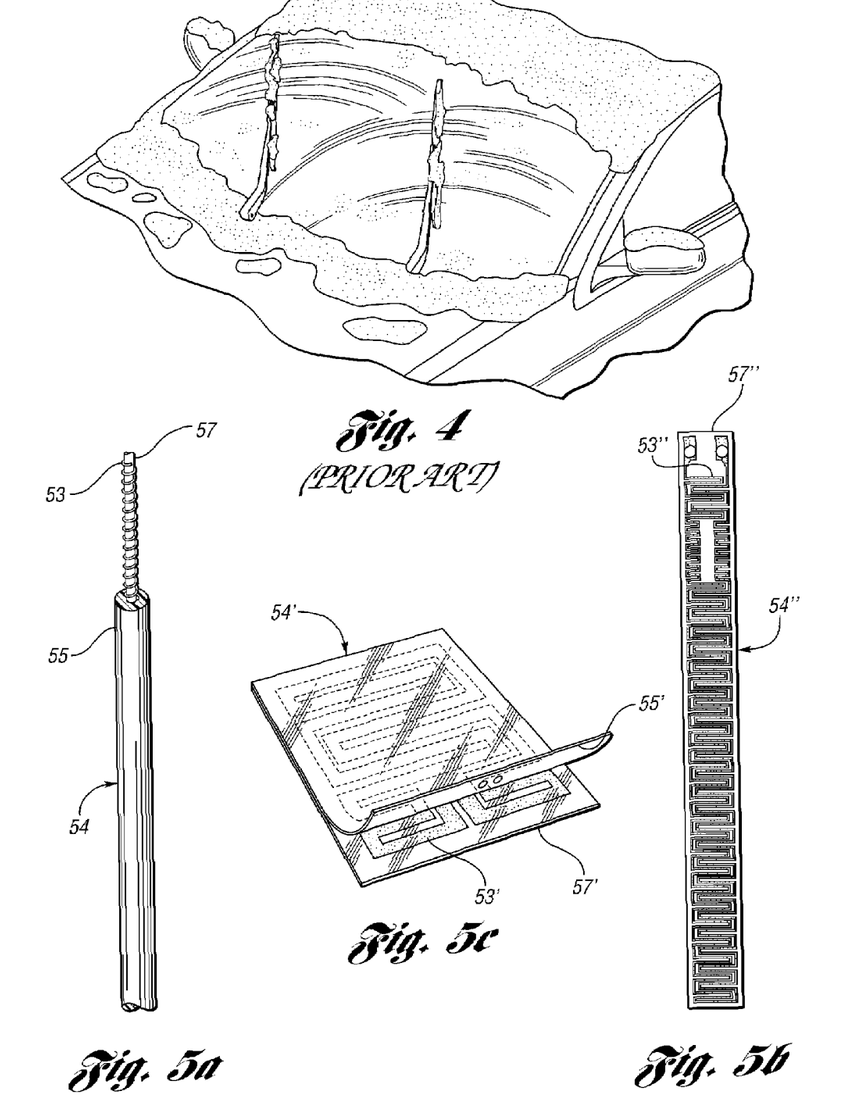
FIG. 4 is an environmental view of a pair of prior art wiper assemblies during their operation on the windshield of a motor vehicle.
FIG. 5a is a perspective view, partially broken away and in cross-section, of one embodiment of a heater having a spiral wound resistance wire for use in a wiper assembly of the present invention.
FIG. 5b is a top plan view of another embodiment of a heater for use in the wiper assembly.
FIG. 5c is a perspective view of yet another embodiment of a heater with its top layer partially folded back to show its etched foil heating element.

Referring to FIG. 4, wintery driving conditions cause snow and ice to build up on windshields and wiper assemblies. This buildup of snow and ice deteriorates the performance of the wiper system to properly clear the windshield. As a result, the operator's visibility is reduced. In an attempt to clear the windshield the operator typically activates the vehicle's defroster system in conjunction with the wiper system. As the snow and ice begin to melt, some of the resulting liquid contacts and refreezes to the wiper assembly and sides of the windshield. Wind combined with the relative motion of the vehicle increases this refreezing effect. As this cycle continues, more and more ice buildup occurs on the wiper assembly and windshield resulting in further reduced wiper system performance and operator visibility. This condition continues to worsen to such a point that the wiper system is rendered useless, thereby creating an extremely dangerous driving situation due to greatly reduced operator visibility.

Currently, the only way to solve this problem is for the operator to manually remove the snow and ice from the wiper blade assembly. This is accomplished after the operator pulls off the road or stops at a stop light. Once stopped, the operator can roll down the window, reach his or her arm around the windshield, and snap the wiper against the windshield in an attempt to clear the snow and ice from the wiper blade assembly. However, once the vehicle is back in motion the icing condition quickly returns, making this is a very ineffective and potentially hazardous solution.

There are a few heated wiper blade assemblies that have been patented and claim to prevent ice and snow from accumulating on the wiper assembly and/or the windshield. Examples of such assemblies are disclosed in the following U.S. patents:

U.S. Pat. No. 5,632,058 discloses a heated wiper assembly including exterior heating elements on blade holders and interior elements embedded in the wiper blades;

U.S. Pat. No. 5,504,965 discloses an electrically heated wiper blade utilizing a spiral coiled resistor wire;

U.S. Pat. No. 4,497,083 discloses the use of resistance heating wires disposed along the length of wiper arms, blades and blade carriers;

U.S. Pat. No. 4,325,160 discloses a windshield wiper blade assembly;

U.S. Pat. No. 2,627,011 discloses a heated wiper/squeegee and frame;

U.S. Pat. No. 6,754,933 discloses radiating heat to a wiper arm structure;

U.S. Pat. No. 6,591,443 discloses heater elements in the blade back and flexible blade body of a wiper;

U.S. Pat. No. 6,236,019 discloses a heated windshield wiper assembly;

U.S. Pat. No. 5,603,856 discloses a heated wiper frame;

U.S. Pat. No. 5,558,792 discloses heater elements in a wiper blade back and blade body;

U.S. Pat. No. 5,488,752 discloses a heat conducting apparatus for wiper blades;

U.S. Pat. No. 5,412,177 discloses a heated wiper blade cover;

U.S. Pat. No. 4,152,808 discloses a heating unit of a windshield wiper;

U.S. Pat. No. 5,325,561 discloses a heated wiper blade assembly in which the wiper linkage, as well as the blade and blade retainer, are heated;

U.S. Pat. No. 4,928,344 discloses an electrically heated wiper blade utilizing a fibrous carbon heating element;

U.S. Pat. No. 4,928,345 discloses a heated wiper blade and blade holder;

U.S. Pat. No. 4,967,437 discloses a heated wiper blade assembly;

U.S. Pat. No. 4,387,290 discloses a heater that extends along a wiper blade and its support;

U.S. Pat. No. 4,194,261 discloses a heated wiper arrangement; and

U.S. Pat. No. 6,779,222 discloses a windshield wiper heating device removably attached to a windshield wiper.

These heated wipers come in many different forms and designs. They heat the wiper frame, arm, and blade or combination of these elements by means of heating an element or some other type of added assembly. These types of wipers are somewhat effective in their own way, but are inconvenient to the manufacturer and end user. They are either very costly to manufacture, thereby resulting in a high cost product that is passed through to the consumer, or they are very complex to install, thereby eliminating many of the "do-it-yourself" consumers. They also fail to mention that wipers should work with the windshield defrosting system and act as one. Without the windshield defroster system, the windshield will only freeze up with the accumulating snow and ice, creating a hazardous situation.

In summary, some of the major disadvantages of the prior art, heated wiper assemblies include cost and the complexity for the everyday "do-it-yourself" consumer. Many do not list the operating range of the wiper, or the heat it will produce. It cannot be assumed that they operate at 12 volts or higher. Most, if not all, vehicles have an operating electrical system of 13.5 to 14.5 volts when in operation. Also, vehicle speed is an important fact to the operation of these wipers.

SUMMARY OF THE INVENTION

An object of the present invention is to provide an improved frameless, heated wiper assembly and a system using one or more of such assemblies to eliminate or greatly reduce icy buildup on the wiper assembly and windshield thereby improving operator visibility while providing at least one of the following advantages:

Is cost effective to manufacture;
Is durable and corrosion resistant;
Is affordable to the average consumer;
Is easy to install by your do-it-yourself consumers;
Works effectively in all weather conditions;
Has low amperage draw and not affect any existing vehicle functions; and
Works in conjunction with the existing vehicle defrosting systems.

In carrying out the above object and other objects of the present invention, a frameless, heated wiper assembly is provided. The assembly is adapted to be mounted on a wiper arm. The wiper arm is operably connected to a wiper motor for reciprocating the wiper arm across a windshield of a vehicle. The assembly is adapted to be electrically coupled to a source of electrical energy of the vehicle. The assembly includes an elongated, resilient blade having a top portion and a bottom squeegee portion for contacting the windshield. The blade has first and second opposed end portions. The assembly also includes spaced, elongated, resilient first and second backing members positioned over the top portion of the blade. Each of the backing members has interior and exterior surfaces and first and second opposed end portions. The assembly further includes first and second spaced, elongated, resilient spines. Each of the spines extends between the end portions of the blade between the top portion of the blade and the interior surfaces of the backing members to connect the blade to the backing members and to allow the blade and the backing members to resiliently conform to the surface configuration of the windshield when the assembly is reciprocated by the wiper arm. The assembly further includes elongated, flexible, first and second heaters to convert electrical energy from the source into heat. The first heater is disposed between the top portion of the blade and the interior surface of the first backing member. The first heater includes a first heating element which extends sinuously between the end portions of the first backing member adjacent the spines. The second heater is disposed between the top portion of the blade and the interior surface of the second backing member. The second heater includes a second heating element which extends sinuously between the end portions of the second backing member adjacent the spines. The heaters heat the top portion of the blade, the first and second backing members and the spines to eliminate or greatly reduce icy buildup on the assembly and the windshield. The assembly includes a center support apparatus which connects the blade and the spines between the backing members and to connect the assembly to the wiper arm. The assembly still further includes wiring electrically coupled to the heaters that extends through the center support apparatus to provide the heaters with electrical energy from the source.

The apparatus may include sealing material for sealing the wiring at the center support apparatus to prevent contamination of the heaters.

The frameless, heated wiper assembly may include of first and second wiper end caps. The first wiper end cap secures the first end portions of the blade and the first backing member together. The second wiper end cap secures the second end portions of the blade and second backing member together. Sealing material may be included for sealing the end portions of the blade and the backing members at the wiper end caps to prevent contamination of the heaters.

Each of the heating elements may include a resistance wire heating element having an electrical resistance within a range of about 18 ohms to about 22 ohms per linear foot.

The wiper assembly, when heated, may have an average temperature of 80° F. when ambient temperature outside the vehicle is 20° F. and vehicle speed is 60 miles per hour.

Each of the heating elements may include an etched foil heating element.

The thickness of the frameless, heated wiper assembly between a top of each of the backing members and a bottom of the squeegee portion may be less than 1 inch.

A controller may be connected to the wiring to control the flow of electrical energy from the source to the heaters.

The controller may include a switch or a relay and circuitry to generate a control signal which controls the relay.

Further in carrying out the above object and other objects of the present invention, a heated wiper system is provided. The system includes a first wiper arm operably connected to a first wiper motor for reciprocating the first wiper arm across a windshield of a vehicle and a source of electrical energy of the vehicle. The system also includes a first frameless, heated wiper assembly mounted on the first wiper arm and electrically coupled to the source. The assembly includes an elongated, resilient blade which has a top portion and a bottom squeegee portion for contacting the windshield and first and second opposed end portions. The assembly also includes spaced, elongated, resilient first and second backing members positioned over the top portion of the blade. Each of the backing members has interior and exterior surfaces and first and second opposed end portions. The assembly still further includes first and second spaced, elongated, resilient spines which extend between the end portions of the blade. Each of the spines is disposed between the top portion of the blade and the interior surfaces of the backing members to connect the blade to the backing members and to allow the blade and the backing members to resiliently conform to the surface configuration of the windshield when the assembly is reciprocated by the wiper arm. The assembly includes elongated, flexible, first and second heaters to convert electrical energy from the source into heat. The first heater is disposed between the top portion of the blade and the interior surface of the first backing member. The first heater includes a first heating element which extends sinuously between the end portions of the first backing member adjacent the spines. The second heater is disposed between the top portion of the blade and the interior surface of the second backing member. The second heater includes a second heating element which extends sinuously between the end portions of the second backing member adjacent the spines. The heaters heat the top portion of the blade, the first and second backing members and the spines to eliminate or greatly reduce icy buildup on the assembly and the windshield. The assembly further includes a center support apparatus which connects the blade and the spines together between the backing members and connects the assembly to the first wiper arm. Wiring is electrically coupled to the source and to the heaters and extends through the center support apparatus to provide the heaters with electrical energy from the source.

The system may include sealing material for sealing the wiring at the center support apparatus to prevent contamination of the heaters.

The system may further include first and second wiper end caps. The first wiper end cap secures the first end portions of the blade and the first backing member together. The second wiper end cap secures the second end portions of the blade and second backing member together. The system may include sealing material for sealing the end portions of the blade and the backing members at the wiper end caps to prevent contamination of the heaters.

Each of the heating elements may include a resistance wire heating element having an electrical resistance within a range of about 18 ohms to about 22 ohms per linear foot.

When heated, the assembly may have an average temperature of 80° F. when ambient temperature outside the vehicle is 20° F. and vehicle speed is 60 miles per hour.

Each of the heating elements may include an etched foil heating element.

The thickness of the assembly between a top of each of the backing members and a bottom of the squeegee portion may be less than 1 inch.

The system may include a controller connected to the wiring and the source to control the flow of electrical energy from the source to the heaters.

The controller may include a switch or a relay and circuitry to generate a control signal which energizes the relay.

A second wiper arm may be operatively connected to a second wiper motor, for reciprocating the second wiper arm across the windshield. A second frameless, heated wiper assembly may be mounted on the second wiper arm, and electrically coupled to the source.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
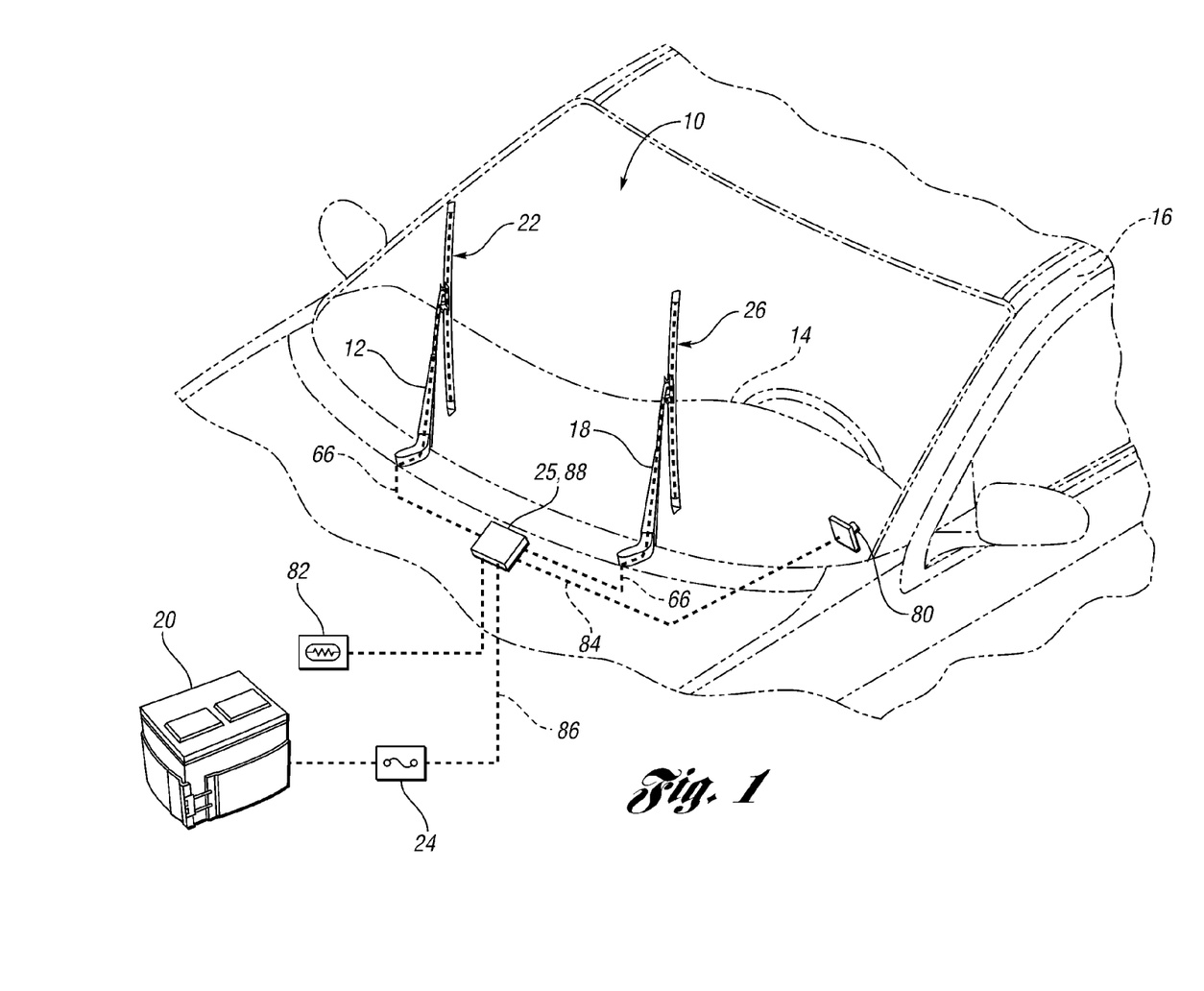
FIG. 1 is an environmental view of a heated wiper system including a pair of wiper assemblies constructed in accordance with an embodiment of the present invention and illustrating their operation to eliminate or reduce icy buildup on both themselves and a windshield of a motor vehicle.

Referring to FIG. 1, a heated wiper system constructed in accordance with one embodiment of the present invention is generally indicated at 10. The system 10 includes a first wiper arm 12 operably connected to a first wiper motor (not shown) for reciprocating the first wiper arm 12 across a windshield 14 of a vehicle 16. The system 10 further includes a second wiper arm 18 operatively connected to a second wiper motor (not shown), for reciprocating the second wiper arm 18 across the windshield 14.

The system 10 also includes a source of electrical energy such as a battery 20 of the vehicle 16 and a first frameless, heated wiper assembly, generally indicated at 22, mounted on the first wiper arm 12 and electrically coupled to the battery 20 through a fuse 24 and either a connection module 25 (i.e. FIG. 6) or a connection module 88 (i.e., FIG. 7) which will be described further hereinbelow. The system 10 typically further includes a second frameless, heated wiper assembly, generally indicated at 26, mounted on the second wiper arm 18, and also electrically coupled to the battery 20 through the fuse 24 and either one of the connection modules 25 or 88. It is to be understood that in some applications, only a single wiper assembly is needed.

Referring now to FIGS. 2, 3, 3a and 3b, only the first frameless, heated wiper assembly 22 is shown and described since the second assembly 26 is substantially identical to the first assembly 22.

The assembly 22 includes an elongated, resilient rubber/silicone blade, generally indicated at 28, having a top portion 30 and a bottom squeegee portion 32 for contacting the windshield 14. The blade 28 also has first and second opposed end portions 34 and 36, respectively.

The assembly 22 also includes spaced, elongated, resilient first and second backing members, generally indicated at 38 and 40, respectively, positioned and secured over the top portion 30 of the blade 28. Each of the backing members 38 and 40 have interior and exterior surfaces 42 and 44, respectively, and first and second opposed end portions 46 and 48, respectively.

The assembly 22 further includes first and second spaced, elongated, resilient spring steel spines, generally indicated at 50 and 52, respectively. Each of the spines 50 and 52 extend between the end portions 34 and 36 of the blade 28 between the top portion 30 of the blade 28 and the interior surfaces 42 of the backing members 38 and 40 to connect the blade 28 and the backing members 38 and 40 together and to allow the blade 22 and the backing members 38 and 42 to resiliently conform to the surface configuration of the windshield 14 when the assembly 22 is reciprocated by the wiper arm 12.

Figures 2, 3, 3A, 3B:
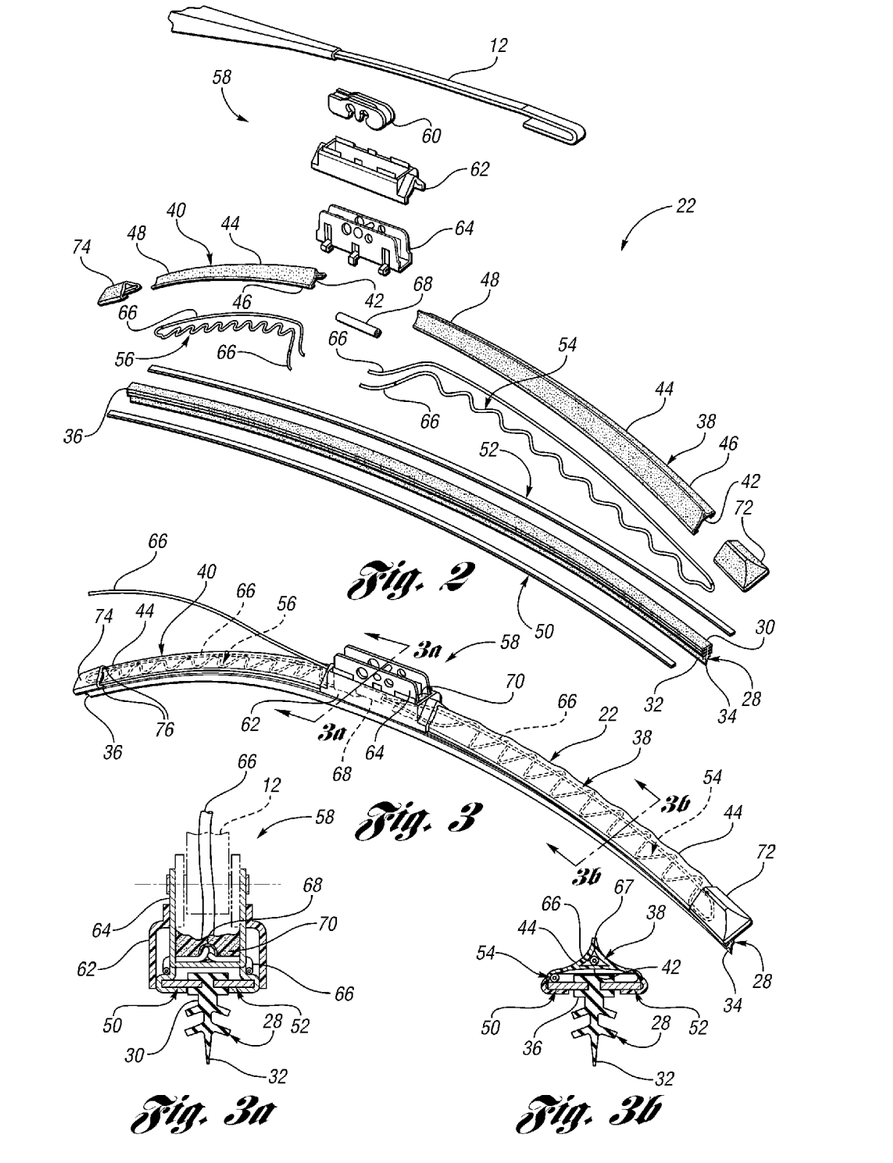
FIG. 2 is an exploded perspective view of one of the wiper assemblies of FIG. 1 and constructed in accordance with an embodiment of the present invention.
FIG. 3 is a perspective view of the wiper assembly of FIG. 2 after assembly.
FIG. 3a is a sectional view taken along lines 3a-3a of FIG. 3.
FIG. 3b is a sectional view taken along lines 3b-3b of FIG. 3.

The assembly 22 also includes elongated, flexible, first and second heaters, generally indicated at 54 and 56, respectively, to convert electrical energy from the battery 20 into heat. The first heater 54 is disposed between the top portion 30 of the blade 28 and the interior surface 42 of the first backing member 38. As illustrated in FIG. 5a, the heater 54 preferably includes a resistance wire heating element 53 which extends sinuously between the end portions 46 and 48 of the first backing member 38 immediately adjacent the spines 50 and 52.

Referring again to FIG. 3, the second heater 56 is disposed between the top portion 30 of the blade 28 and the interior surface 42 of the second backing member 40. The second heater 56 also preferably includes a resistance wire heating element 53 which extends sinuously between the end portions 46 and 48 of the second backing member 40 immediately adjacent the spines 50 and 52. The top portion 30 of the blade 28, the first and second backing members 38 and 40 and the spines 50 and 52 are heated by the heaters 54 and 56 to eliminate or greatly reduce icy buildup on the assembly 22 and the windshield 14.

The assembly 22 further includes a center support apparatus, generally indicated at 58, which connects the blade 28 and the spines 50 and 52 together between the backing members 38 and 40 and to connect the assembly 22 to the wiper arm 12. The apparatus 58 includes an adapter 60 for removably securing the arm 12 to the assembly 22. The apparatus 58 also includes a cover member 62 and a center connector 64, both of which are assembled together at the spines 50 and 52 adjacent the end portions 48 and 46 of the backing members 38 and 40, respectively, to help secure the assembly 22 together.

The assembly 22 also includes first and second wiper end caps 72 and 74, respectively. The first wiper end cap 72 secures the first end portions 34 and 46 of the blade 28 and the first backing member 38, respectively, together. The second wiper end cap 74 secures the second end portions 36 and 48 of the blade 28 and second backing member 40 respectively, together. Sealing material 76 such as liquid rubber seals the end portion 34 and 36 of the blade 28 and the end portions 46 and 48 of the backing members 38 and 40, respectively, at the wiper end caps 72 and 74, respectively, to prevent contamination of the heaters 54 and 56, respectively.

Wiring 66 is electrically coupled at both ends of the heaters 54 and 56 and extends through hollow portions 67 of the backing members 38 and 40 and through the center support apparatus 58 between the member 62 and the connector 64 to provide the heaters 56 and 58 with electrical energy from the battery 20. End portions of the wiring 66 are connected together by silver solder within a shrink tube 68 located within the connector 64 and sealed with sealing material 70 to prevent contamination of the heaters 54 and 56. The heaters 56 and 58 are preferably connected in parallel but could be connected in series by the wiring 66.

FIG. 5*a* illustrates one embodiment of the heater 54 (as well as the heater 56). The heater 54 is a wire/cord spiral wound cable including a resistance wire heating element or conductor 53 wound about a glass fiber core 57. A silicon rubber insulator 55 encapsulates the conductor 53 and the core 57. The heating element 53 may be a Nichrome resistance wire.

FIG. 5*b* illustrates another embodiment of a heater for use in the assemblies 22 and 26 wherein parts of the heater 54" having the same or similar structure or function to the parts of the heater 54 have a double prime designation. The heater 54" is a Kapton style heater having an etched foil heating element 53" that extends sinuously between the sides of the heater 54" and is formed on a plastic base 57". A plastic cover typically covers the heating element 53".

FIG. 5*c* illustrates yet another embodiment of a heater for use in the assemblies 22 and 26 wherein parts having the same or similar structure or function to the parts of the heater 54 have a single prime designation. The heater 54' is PET film style heater also having an etched foil heating element 53' which travels sinuously between the sides of the heater 54'. The heating element 53' is formed on a PET film 57' and has a PET film cover 55'.

One or both of the electric heaters may be one of the following styles: Wire cable style (FIG. 5*a*); Kapton style, ribbon/tape (FIG. 5*b*); Butyl style, wire wound pad; Wire tape; Single wire style; Screen printing; Silicon wire wound pad; PET film (FIG. 5*c*). The heater types may be one or more of the following: Wire wound; Etched foil; Wire cable, silicon/pvc. The compounds or materials may include one or more of the following: Wire Nickel-Chromium; Foil; Printing; Copper Nickel.

Any of the above can be used. However, the cost of wire spiral wound cable (i.e., FIG. 5*a*) is considerably less. The wire spiral cable heater 54 is an off-the-shelf product, wherein all the others would need to be custom made for each application.

Referring again to FIG. 1, the operation of the wiper system 10, is now described. The heated frameless wiper assemblies 22 and 26 receive a DC voltage from the vehicle's battery 20. The battery 20 delivers power to the assemblies 22 and 26 wherein a control device such as a manually operable switch 80 closes the circuit between the battery 20 and the assemblies 22 and 26. The switch 80 is typically located in the driver compartment. Once activated by the driver, the switch 80 provides power from the battery 20 to the connection module 25 which is typically located under the vehicle's hood in the engine compartment. From the connection module 25, power from the battery 20 is directed to the wiper assemblies 22 and 26 and travels up the wiper arms 12 and 18 by the wiring 66 and to the heaters 54 and 56 of the assemblies 22 and 26.

Figure 6:
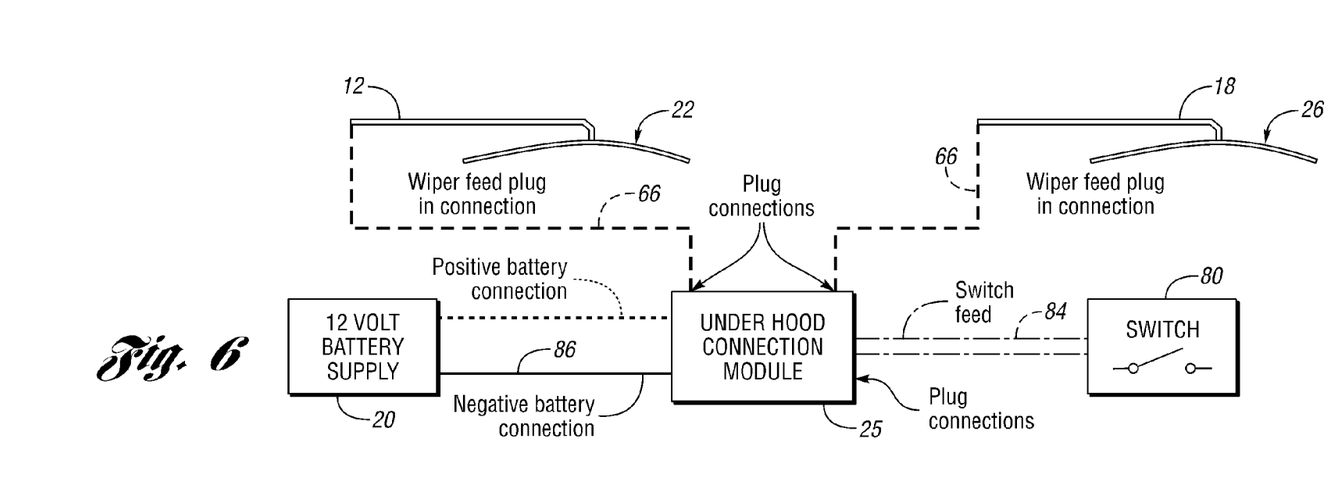
FIG. 6 is a schematic block diagram of a heated wiper system constructed in accordance with one embodiment of the invention and illustrating a typical wiring installation with a manually operable switch.

Referring to FIGS. 1 and 6, there are typically only four connections that need to be made for this operation. Three connections are made at the connection module 25. This is done by simply plugging in wiring 66 from the two wiper assemblies 22 and 26 and wiring 84 from the switch 80 into the connection module 25. The other connection is made to the vehicle's battery 20 by wiring 86 from the connection module 25.

Figure 7:
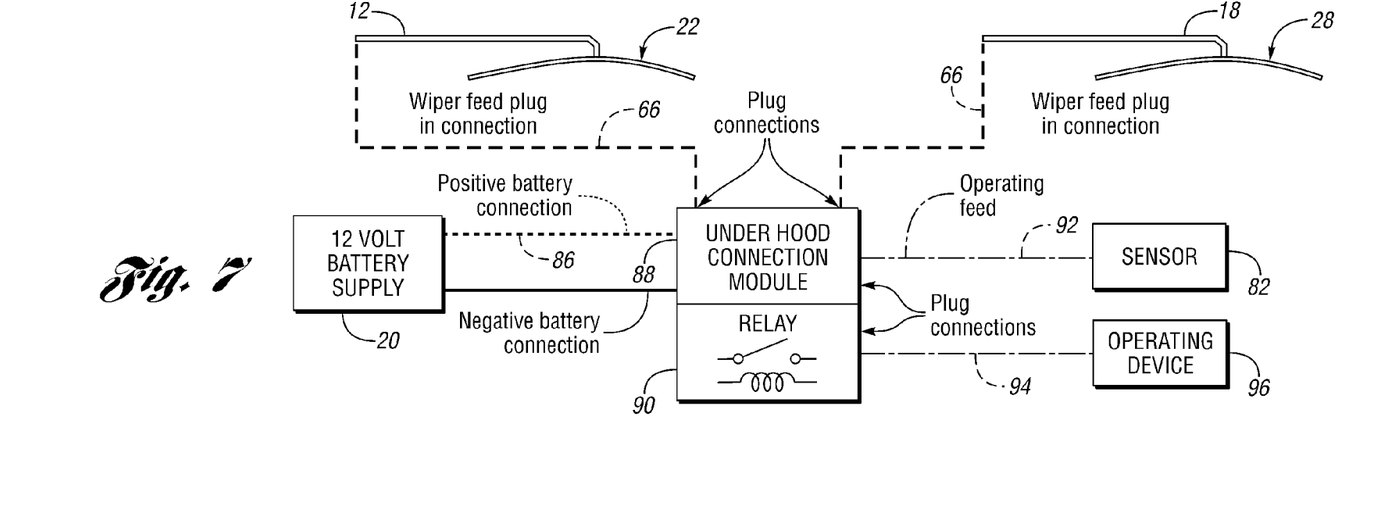
FIG. 7 is a schematic block diagram similar to the diagram of FIG. 6 but illustrating an optional wiring installation having a connection module with a relay which is operable with a control signal.

In another more automatic embodiment described in detail below, a temperature sensor 82 is located on the vehicle 16 to obtain ambient vehicle temperature and is connected to a connection module 88 by wiring 92 as shown in FIG. 7. In this embodiment, the module 88 includes conventional circuitry in combination with a relay 90 to automatically close the circuit between the battery 20 and the assemblies 22 and 26. Such automatic closing may be done when external vehicle temperature drops below a level predetermined by the sensor 82.

Referring now to FIGS. 1 and 6, there is illustrated a "standard" installation of the wiper assemblies 22 and 26 to obtain a system in accordance with one embodiment of the present invention as follows:

Mount the hood connection module 25 in the engine compartment area of the vehicle 16 between the wiper arms 12 and 18.

Remove old wiper assemblies (i.e., of FIG. 4) and install new heated assemblies 22 and 26.

Route and connect wiper feed wires 66 from the assemblies 22 and 26 to the under-hood connection module 25 and plug in.

Attach wiper feed wires 66 to their respective wiper arms 12 and 18.

Route switch feed wire 84 to interior of vehicle 16 and attach to the manual switch 80.

Mount manual switch 80 to desired location within the driver compartment.

Route and connect supply wires 86 and the fuse 24 from the module 25 to the battery 20.

Referring now to FIGS. 1 and 7, there is illustrated a more "deluxe" or optimal installation of wiper assemblies 22 and 26 to obtain another system constructed in accordance with another embodiment of the present invention as follows:

Mount the hood connection module 88 in the engine compartment area of the vehicle 16 between the wiper arms 12 and 18.

Remove old wiper assemblies (i.e., of FIG. 4) and install new heated assemblies 22 and 26.

Route left and right wiper feed wires 66 to the under-hood connection module 88 and plug in.

Attach wiper feed wires 66 to the wiper arms 12 and 18.

Route and connect the supply wires 86 and the fuse 24 from the module 88 to the battery 20.

Route operating feed wire 92 from the sensor 82 to interior of the vehicle 16 and route and connect a wire 94 from an operating device 96 (body control module, automatic module, electronic control unit or defroster feed) to the relay 90 of the module 88 to permit the assemblies 22 and 26 to be heated in an automatic fashion.

The heated wiper assemblies 22 and 26 and the heated wiper system 10 constructed in accordance with at least one embodiment of the present invention includes one or more of the following benefits:

A plug and play installation is provided where there are no external wiring connections that can cause a corrosion concern.

A low profile heated wiper assembly design is provided that protrudes less than one inch (i.e., preferably ¾")

above the windshield 14, which helps reduce the accumulation of snow and ice thereon.

There are no external heating components which reduces the surface area, preventing the wiper assemblies 22 and 26 from lifting when driving at high speeds.

A heated, sealed, frameless/hingeless wiper assembly design is provided which eliminates pivot/pressure points from freezing and wearing out. This heated wiper assembly design allows maximum windshield contact, regardless of weather conditions, with variable flexing action to the windshield 14.

The sealed, frameless, heated wiper assembly design also allows for a more effective heating function. The heating elements or heaters provide effective and efficient heating by not having pivot/pressure points of a standard frame, focusing on providing heat to the wiper assembly at a very low current draw. In turn, this allows for very small wire leads to be used which also reduces the profile and surface area of the wiper assembly. This very low current draw allows for many different types of power supply, from a simple switch installation to OEM style installation from the body control module giving this design an automatic operation option. The total cost to the manufacturer and to the consumer is very low with this style of heated wiper assembly. By reducing the amount of surface area that needs to be heated and using a zig-zag or sinuous layout of the heating elements or heaters to reduce buildup of snow and ice on both sides of the wiper assembly, the amount of materials and manufacturing process required to produce this product are minimal. This zig-zag design does not hinder the function of the wiper assemblies in any way. For the price of standard premium non-heated wiper assemblies, the consumer would have the added benefit of heated wiper assemblies.

This style of heated wiper assemblies constructed in accordance with the present invention will fit virtually any size and style of vehicles on the road today. This design is not just limited to passenger vehicles. Virtually any windshield wiping application can be retrofitted with this design. By simply replacing the existing wiper blade assembly (not the arm) and making a few electrical connections, the consumer now has the additional benefit of heated blade assemblies. This style further keeps manufacturing cost very low since there is no need to produce multiple wiper arm styles to fit numerous applications.

This style of heated wiper assembly does not require any special type of controller to maintain heat range to operate; it simply needs a power source such as a vehicle battery. It can maintain a heating level necessary for melting ice and snow. As an option, it can be operated in many different ways if the consumer should choose. Since it operates at a very low operating current, the wiper heating operation can be controlled by the automatic temperature sensor 82 and/or by a vehicle's body control module (96 in FIG. 7) in conjunction with the defrosting system.

It is a self-contained, sealed, heated wiper assembly with no assembly, making it the ideal "self-installed" system for the vehicle owner.

Some data associated with one embodiment of the above-noted heated wiper assembly and heated wiper system are as follows:

Very low 2-3 amp average operating current per wiper assembly pair

Sealed one piece design 0.006 in. diameter heating wire or element (i.e., FIG. 5a)

80° F. average temperature at 20° F. exterior temperature at 60 mph

Heated sealed frameless/hingeless design no pivot/pressure points

Variable flexing to the windshield 14

Easy installation 12-14.5 volt operating optimum range

Universal fit 18-22 ohm's per foot of the heater wire (FIG. 5a)

Zig-zag heating element design provides effective and efficient heating to all sides (FIGS. 5a, 5b and 5c)

Low profile ¾ in. above the windshield 14

Low cost of ownership

No external electrical connects or heating components

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A frameless, heated wiper assembly adapted to be mounted on a wiper arm operably connected to a wiper motor for reciprocating the wiper arm across a windshield of a vehicle and adapted to be electrically coupled to a source of electrical energy of the vehicle, the assembly including: an elongated, resilient blade having a top portion and a bottom squeegee portion for contacting the windshield and having first and second opposed end portions; spaced, elongated, resilient first and second backing members positioned over the top portion of the blade, each of the backing members having interior and exterior surfaces and first and second opposed end portions; first and second spaced, elongated, resilient spines, each of the spines extending between the end portions of the blade between the top portion of the blade and the interior surfaces of the backing members to connect the blade and the backing members and to allow the blade and the backing members to resiliently conform to the surface configuration of the windshield when the assembly is reciprocated by the wiper arm; and a center support apparatus connecting the blade and the spines together between the backing members and to connect the assembly to the wiper arm; wherein the improvement comprises:

elongated, flexible, first and second heaters to convert electrical energy from the source into heat, the first heater being disposed between the top portion of the blade and the interior surface of the first backing member in direct contact with the interior surface of the first backing member and an exterior surface of the top portion of the blade, the first heater including a first heating element which extends sinuously between the end portions of the first backing member adjacent the spines, the second heater being disposed between the top portion of the blade and the interior surface of the second backing member in direct contact with the interior surface of the second backing member and an exterior surface of the top portion of the blade, the second heater including a second heating element which extends sinuously between the end portions of the second backing member adjacent the spines wherein the heaters directly heat the top portion of the blade, the first and second backing members and the spines to eliminate or greatly reduce icy buildup on the assembly and the windshield; and wiring electrically coupled to the heaters and extending through the center support apparatus to provide the heaters with electrical energy from the source.

2. The assembly as claimed in claim 1 further comprising sealing material for sealing the wiring at the center support apparatus to prevent contamination of the heaters.

3. The assembly as claimed in claim 2 further comprising:
first and second wiper end caps, the first wiper end cap securing the first end portions of the blade and the first backing member together and the second wiper end cap securing the second end portions of the blade and second backing member together; and
sealing material for sealing the end portions of the blade and the backing members at the wiper end caps to prevent contamination of the heaters.

4. The assembly as claimed in claim 1, wherein each of the heating elements includes a resistance wire heating element.

5. The assembly as claimed in claim 4, wherein each of the resistance wire heating elements has an electrical resistance within a range of about 18 ohms to about 22 ohms per linear foot.

6. The assembly as claimed in claim 1, wherein the assembly, when heated, has an average temperature of 80° F. when ambient temperature outside the vehicle is 20° F. and vehicle speed is 60 miles per hour.

7. The assembly as claimed in claim 1, wherein each of the heating elements includes an etched foil heating element.

8. The assembly as claimed in claim 1, wherein thickness of the assembly between a top of each of the backing members and a bottom of the squeegee portion is less than 1 inch.

9. The assembly as claimed in claim 1 further comprising a controller connected to or to connect to the wiring to control the flow of electrical energy from the source to the heaters.

10. The assembly as claimed in claim 9, wherein the controller includes a switch.

11. The assembly as claimed in claim 9, wherein the controller includes a relay.

12. The assembly as claimed in claim 11, wherein the controller includes circuitry to generate a control signal which controls the relay.

13. A heated wiper system including a first wiper arm operably connected to a first wiper motor for reciprocating the first wiper arm across a windshield of a vehicle, a source of electrical energy of the vehicle, and a first frameless, heated wiper assembly mounted on the first wiper arm and electrically coupled to the source, the assembly including: an elongated, resilient blade having a top portion and a bottom squeegee portion for contacting the windshield and having first and second opposed end portions; spaced, elongated, resilient first and second backing members positioned over the top portion of the blade, each of the backing members having interior and exterior surfaces and first and second opposed end portions; first and second spaced, elongated, resilient spines extending between the end portions of the blade, each of the spines being disposed between the top portion of the blade and the interior surfaces of the backing members to connect the blade and the backing members and to allow the blade and the backing members to resiliently conform to the surface configuration of the windshield when the assembly is reciprocated by the wiper arm; a center support apparatus connecting the blade and the spines together between the backing members and connecting the assembly to the first wiper arm; wherein the improvement comprises:
elongated, flexible, first and second heaters to convert electrical energy from the source into heat, the first heater being disposed between the top portion of the blade and the interior surface of the first backing member in direct contact with the interior surface of the first backing member and an exterior surface of the top portion of the blade, the first heater including a first heating element which extends sinuously between the end portions of the first backing member adjacent the spines, the second heater being disposed between the top portion of the blade and the interior surface of the second backing member in direct contact with the interior surface of the second backing member and an exterior surface of the top portion of the blade, the second heater including a second heating element which extends sinuously between the end portions of the second backing member adjacent the spines, wherein the heaters directly heat the top portion of the blade, the first and second backing members and the spines to eliminate or greatly reduce icy buildup on the assembly and the windshield; and
wiring electrically coupled to the source and to the heaters and extending through the center support apparatus to provide the heaters with electrical energy from the source.

14. The system as claimed in claim 13 further comprising sealing material for sealing the wiring at the center support apparatus to prevent contamination of the heaters.

15. The system as claimed in claim 14 further comprising:
first and second wiper end caps, the first wiper end cap securing the first end portions of the blade and the first backing member together and the second wiper end cap securing the second end portions of the blade and second backing member together; and
sealing material for sealing the end portions of the blade and the backing members at the wiper end caps to prevent contamination of the heaters.

16. The system as claimed in claim 13, wherein each of the heating elements includes a resistance wire heating element.

17. The system as claimed in claim 16, wherein each of the resistance wire heating elements has an electrical resistance within a range of about 18 ohms to about 22 ohms per linear foot.

18. The system as claimed in claim 13, wherein the assembly, when heated, has an average temperature of 80° F. when ambient temperature outside the vehicle is 20° F. and vehicle speed is 60 miles per hour.

19. The system as claimed in claim 13, wherein each of the heating elements includes an etched foil heating element.

20. The system as claimed in claim 13, wherein thickness of the assembly between a top of each of the backing members and a bottom of the squeegee portion is less than 1 inch.

21. The system as claimed in claim 13 further comprising a controller connected to the wiring and the source to control the flow of electrical energy from the source to the heaters.

22. The system as claimed in claim 21, wherein the controller includes a switch.

23. The system as claimed in claim 21, wherein the controller includes a relay.

24. The system as claimed in claim 23, wherein the controller includes circuitry to generate a control signal which energizes the relay.

25. The system as claimed in claim 13, wherein the system further comprises a second wiper arm operatively connected to a second wiper motor, for reciprocating the second wiper arm across the windshield and a second frameless, heated wiper assembly mounted on the second wiper arm, and electrically coupled to the source.

* * * * *